(12) United States Patent
Haulin et al.

(10) Patent No.: US 12,343,879 B2
(45) Date of Patent: Jul. 1, 2025

(54) SAFETY FUNCTIONS IN AN INDUSTRIAL ROBOT

(71) Applicant: ABB Schweiz AG, Baden (CH)

(72) Inventors: Jonas Haulin, Shanghai (CN); Tomas Groth, Västerås (SE); Stefan Romberg, Västerås (SE); Richard Roberts, Gilching (DE); Tobias Berninger, Türkenfeld (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/863,780

(22) PCT Filed: May 13, 2022

(86) PCT No.: PCT/EP2022/063103
§ 371 (c)(1),
(2) Date: Nov. 7, 2024

(87) PCT Pub. No.: WO2023/217395
PCT Pub. Date: Nov. 16, 2023

(65) Prior Publication Data
US 2025/0108510 A1    Apr. 3, 2025

(51) Int. Cl.
*B25J 9/16* (2006.01)
*B25J 19/00* (2006.01)

(52) U.S. Cl.
CPC ............. *B25J 9/1674* (2013.01); *B25J 9/161* (2013.01); *B25J 19/0004* (2013.01)

(58) Field of Classification Search
CPC ....... B25J 9/1674; B25J 9/161; B25J 19/0004
See application file for complete search history.

(56) References Cited

U.S. PATENT DOCUMENTS

| 4,737,697 A | 4/1988 | Maruo et al. |
| 6,212,443 B1 | 4/2001 | Nagata et al. |
| 2017/0172671 A1* | 6/2017 | Miller ................. A61B 34/30 |

FOREIGN PATENT DOCUMENTS

WO    WO-2010088959 A1 *    8/2010    ........... G05B 19/423

OTHER PUBLICATIONS

Schreiber, Gnter, et al.; "An Intuitive Interface For Nullspace Teaching Of Redundant Robots"; 7th International Symposium on Advances in Robot Kinematics; Portoroz, Slovenia; Dec. 31, 2000; 8 Pages.

(Continued)

*Primary Examiner* — Adam R Mott
*Assistant Examiner* — Sagar Kc
(74) *Attorney, Agent, or Firm* — Whitmyer IP Group LLC (57) ABSTRACT

A method of controlling an industrial robot, including a robot controller, a programming interface, which is separate from the robot controller, and a robot manipulator with a plurality of actuators. The method includes: receiving a first release signal via a first safe input means; receiving actuator-selection data, which indicates one or more of the actuators, via an arbitrary input means at the programming interface; receiving a second release signal via a second safe input means at the programming interface after having received the actuator-selection data; and, in response to determining that the first and second release signals are still received, causing the actuators indicated by the actuator-selection data to enter a movement-without-drive-power mode.

19 Claims, 4 Drawing Sheets

(56) References Cited

OTHER PUBLICATIONS

Teradyne Robotics Company; "Universal Robots, User Manual UR5/CB3"; Version 3.3.3; Retrieved from Internet; Dec. 31, 2016; 189 Pages.

International Search Report and Written Opinion of the International Searching Authority; Application No. PCT/EP2022/063103; Completed: Dec. 16, 2022; Mailing Date: Dec. 23, 2022; 17 Pages.

\* cited by examiner

SAFETY FUNCTIONS IN AN INDUSTRIAL ROBOT

TECHNICAL FIELD

The present disclosure relates to the field of safety functions adapted for industrial robots and in particular to a method of activating a Movement without Drive Power (MwoDP) mode.

BACKGROUND

The ISO 10218-1 standard (Robots and robotic devices-Safety requirements for industrial robots—Part 1: Robots) specifies requirements and guidelines for inherently safe design of, protective measures for, and information for the use of industrial robots. It describes basic hazards associated with robots and provides requirements to eliminate, or adequately reduce, the risks associated with these hazards. In particular, robots compliant with ISO 10218-1 shall be designed so that the axes are capable of being moved without the use of drive power in emergency or abnormal situations. Such movability without drive power may also be useful in a maintenance or servicing context. Where practicable, moving the axes shall be carried out by a single person. Controls shall be readily accessible but protected from unintended operation. Instructions for doing this shall be included in the information for use along with recommendations for training personnel on responding to emergency or abnormal situations.

A brake-release functionality in one existing product on the market is activated if an operator interacts with a connected teach pendant as follows:
1. A Mode switch is set to Manual mode.
2. A Teach button is pressed.
3. An Enable switch is pressed.
4. A Caution button is pressed.

The product is configured such that, after this interaction sequence has been completed, the brakes of a particular robot joint are released for as long as a selector button associated with that joint is depressed. The selector button belongs to a graphical user interface (GUI) displayed on the teach pendant. Because, from step 4 onwards, a press on the selector button is enough to release the brakes, a second operator should preferably be supporting the robot manipulator or be prepared to catch it. Such precautions are well justified, as a freely falling manipulator might otherwise hit persons and objects badly, or the manipulator itself could suffer structural damage.

The very fact that the GUI operates with hardware and software that are, at least in part, not safety-certified also implies a non-negligible risk of having the brake-release functionality triggered by an erroneous signal. The erroneous signal could result from a mistake by the operator at runtime, from electromagnetic interference and other hardware defects, or from programming oversights. Further still, the button associated with the joint is a mechanical component, which constitutes a significant error source in itself. It would be desirable to propose an improved product design with a smaller exposure to this scenario.

SUMMARY

One objective of the present disclosure is to make available a method of controlling an industrial robot such that it enters a MwoDP mode only in response to safely generated signals. Another objective is to make available such a method with an increased robustness to a human operator's unintentional activation. A further objective is to achieve the sought improvement without having to increase the number of safe signals or safe signal input means in the robot system. A further objective is to propose a method suitable for integration in an existing installation (retrofitting). A further objective is to achieve the improved safety without sacrificing usability, specificity or other aspects of operator convenience. A still further objective is to make available a programming interface for an industrial robot adapted for safe activation of the robot's MwoDP mode.

At least some of these objectives are achieved by the invention as defined by the independent claims. The dependent claims are directed to advantageous embodiments of the invention.

In a first aspect of the invention, there is provided a method of controlling an industrial robot. It is understood that the industrial robot includes at least a robot controller, a programming interface (or teach pendant), which is separate from the robot controller, and a robot manipulator with a plurality of actuators. The method comprises: receiving a first release signal via a first safe input means; receiving actuator-selection data, which indicates one or more of the actuators, via an arbitrary input means at the programming interface; receiving a second release signal via a second safe input means at the programming interface after having received the actuator-selection data; and, in response to determining that the first and second release signals are still received, causing the actuators indicated by the actuator selection data to enter a MwoDP mode.

In the method according to the first aspect of the invention, the MwoDP mode is entered in response to the receiving of a signal via a safe input means. The method is different from the interaction sequence in the existing product described above, which has one state where the brake-release functionality can be activated by the unsafe selector button on its own. The method according to said first aspect also uses an arbitrary input means (which may in particular be implemented cost-efficiently as a non-safe input means) but in a different sequence, and it is therefore safer than the existing product in this respect.

It is noted that the invention achieves the safety improvement without increasing the number of signals in need of being "safe" (see below). Specifically, the actuator-selection data is received via an arbitrary input means for which no particular safety classification is required, such as an interactive graphical user interface displayed on a screen. This way, operators can benefit from a sophisticated and/or easily updatable interface to enter the actuator-selection data, which typically comprises relatively more complex information than the release signals. For comparison, the release signals can signify Boolean variables (although they may be transmitted in the form of longer codes for technical reasons). The risk of receiving incorrect actuator-selection data via the screen becomes acceptable since the actuator-selection data will not be executed in the absence of the second release signal. In some embodiments, this risk is further mitigated by the fact that the screen is further configured to display a user interface related to functionalities other than the MwoDP mode, whereby any errors are likely to be discovered early and outside a safety-critical context.

In some embodiments, an additional timeout condition is applied, by which the second release signal is required to be received within a predefined timeout period. Accordingly, if the timeout period is exceeded, the outcome of the determination will be negative even if both the first and second release signals are simultaneously received at a later point in time. These embodiments may be less sensitive to inadvertent activation due to operator negligence.

In some embodiments, a visual indicator associated with the robot manipulator is exhibited (e.g., a lighting element on the robot manipulator is illuminated) while the graphical user interface is being displayed on the screen, or while it is being accessed by a user, or in both of these states. The visual indicator alerts nearby people that the robot might enter a MwoDP mode shortly, which could bring the hazards noted above.

Some embodiments are concerned with the case where an alternative input port separate from the programming interface is provided. This will allow convenient integration with an existing robot system. In these embodiments, the method further comprises receiving static actuator-selection data by pre-programming. Then, in response to determining that the first release signal is still received and that the second release signal is received via the alternative input port the actuators indicated by the static actuator-selection data are caused to enter the MwoDP mode. Some implementations of these embodiments may be combined with a modified variant of the showing of the visual indicator described above.

In still further embodiments, freely combinable with all of those above, a safe communication protocol is used to transmit a command from the programming interface to the robot controller causing the indicated actuators to enter the MwoDP mode.

In a second aspect of the invention, there is provided a programming interface for an industrial robot at least a robot controller, which is separate from the programming interface, and a robot manipulator with a plurality of actuators. The programming interface comprises: first and second safe input means, an arbitrary input means, a control interface adapted for communication with the robot controller, as well as processing circuitry configured to perform the method according to the first aspect of the invention.

The programming interface generally shares the effects and advantages to be expected with the first aspect of the invention, and it can be embodied with a corresponding degree of technical variation.

The invention further relates to a computer program containing instructions for causing a computer, or the programming interface in particular, to carry out the above method. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

In the terminology of the present disclosure, a "safe" input means is one which has been designed in view of a trusted safety protocol and/or passed a dedicated safety validation procedure. The expression "non-safe input means" shall include not only input means known to have failed to meet these requirements but also input means with a currently unknown safety-related performance. Indeed, it follows from widely accepted risk assessment methodologies that equipment with an unknown safety-related performance shall be treated as unsafe equipment.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order described, unless explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, on which certain embodiments of the invention are shown. These aspects may, however, be embodied in many different forms and should not be construed as limiting; rather, these embodiments are provided by way of example so that this disclosure will be thorough and complete, and to fully convey the scope of all aspects of the invention to those skilled in the art. Like numbers refer to like elements throughout the description.

Figure 1:
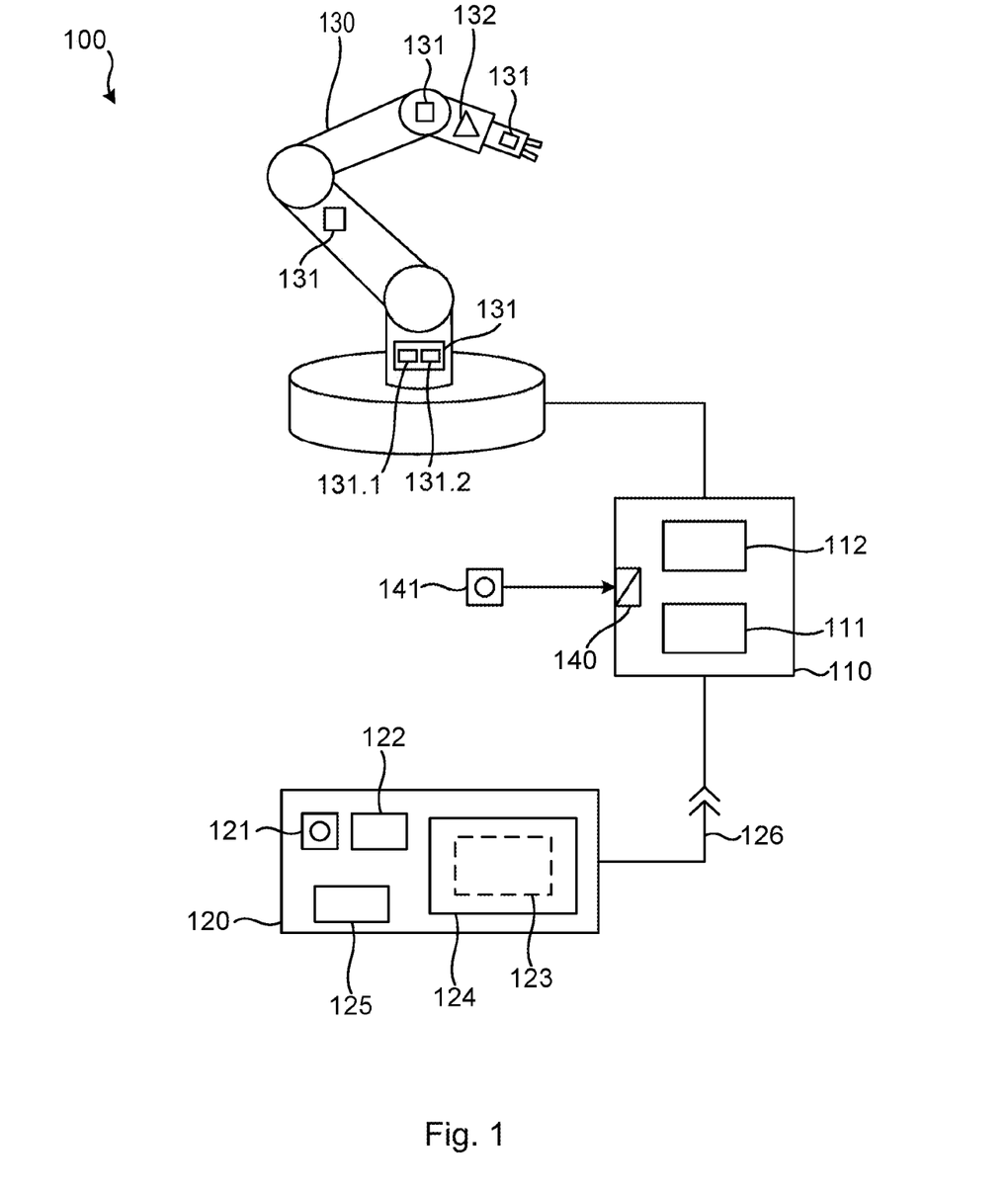
FIG. 1 shows an industrial robot with a connected programming interface.

FIG. 1 shows an industrial robot 100 comprising the following components: a robot controller 110, a programming interface (or teach pendant) 120 and a robot manipulator (or robot arm) 130. For reasons to be explained next, the programming interface 120 may be considered to be a non-permanent component of the industrial robot 100.

The robot controller 110 is configured to supply control signals to actuators 131 in the robot manipulator 130 and to monitor sensor signals from sensors (not shown) in the robot manipulator 130. These control signals and sensor signals may be exchanged over a wired or wireless interface. The robot manipulator 130 may be configured to execute, at each point in time, signals from at most one designated robot controller 110. Conversely, the robot manipulator 130 may be configured to share the sensor signals only with the designated robot controller 110. Further, the robot controller 110 may be configured to control a single robot manipulator 130 at a time, whereby the robot controller and robot manipulator can be considered to be in a one-to-one relationship. The robot controller 110 comprises at least processing circuitry 111 and a memory 112. The robot controller 110 in FIG. 1 is shown with an alternative input port 140 to which an input means 141 can be connected. The alternative input port 140 may be a generic data port, and a proposed use of it will be described later. In some embodiments, the processing circuitry 111, memory 112 and the alternative input port 140, some or all of which may be active during the execution of the method 200 to be described, may belong to a so-called safety controller within the robot controller 110.

The robot manipulator 130 illustrated in FIG. 1 constitutes stationary robot equipment although, in other embodiments, it may be a mobile robot. The robot manipulator 130 may for example be a lightweight manipulator with a lifting capacity of at most 20 kg, such as at most 10 kg, such as at most 5 kg. In particular, the robot manipulator 130 may belong to a collaborative robot 100 adapted for cooperative work with one or more operators. In the embodiment shown in FIG. 1, the robot manipulator 130 comprises a base, from which extend multiple members linked by rotary or linear joints, and is configured to carry a tool (or end effector, by another term) at its distal end. Actuators 131 for applying accelerating or decelerating torques, and forces are arranged in the robot manipulator 130. At least some of the actuators 131 comprise drive means 131.1 and braking means 131.2. The drive means 131.1 may for example be electrically, hydraulically or pneumatically powered. The braking means 131.2 may comprise moving parts powered in the same ways, and it is configured to generate the braking force by magnetic, frictional or form-locking action. The braking means 131.2 is configured to engage while the drive means 131.1 is inactive, except when the robot 100 is in a movement-without-drive-power (MwoDP) mode. The braking means 131.2 is configured to have this behavior by being fitted with a physical or mechanical arrangement (e.g., a spring-loading mechanism that is released by a movement of the drive means 131.1), a suitably programmed embedded controller, firmware, or other suitable logic. It is understood that a corresponding behavior—by which an actuator 131 'freezes' during periods of inactivity—can readily be achieved by applying structural and functional solutions within skilled persons' common general knowledge, even in actuators 131 that do not have the illustrated structure with drive means 131.1 and braking means 131.2. Such solutions are encountered in many industrial robots on the market.

The robot manipulator 130 shown in FIG. 1 is furthermore equipped with a visual indicator 132, such as an indicator lamp or a sign with variable appearance. The indicator lamp or sign may be arranged where it is easily visible, such as in the vicinity of the end effector. In other embodiments, the robot manipulator 130 may be associated with a visual indicator 132 in other ways; for example, the visual indicator 132 may be mounted or suspended in the vicinity of the robot manipulator 130 where it is visible to operators and any bystanders. Further alternatively, the visual indicator 132 may be labelled with a name or other identifier of the robot manipulator 130.

The programming interface 120 is equipped with various input means 121, 122, a screen 124 and processing circuitry 125. The input means 121, 122 may include a key, keypad, touchpad, wheel, joystick, or a switch (selector) with two or more positions. It is noted that the screen 124 and some of the input means 121, 122 may be arranged on opposite sides of the programming interface 120. In FIG. 1, a first one 121 of the input means is a button with latching, which is arranged to remain active (i.e., depressed) after the operator lets go of it; the button may be restored to its inactive position by a latch-release maneuver, such as a rotation of the button around its axis. This type of button is frequently used as an industrial emergency stop (ESTOP) button. In FIG. 1, further, a second one 122 of the input means is a three-position safety switch (also referred to as a three-stage enable switch), which comprises a spring-loaded knob or stick that is linearly movable by hand between two inactive end positions, between which an active position is defined. Such a three-position safety switch is considered to be very robust to inadvertent manual activation, as the knob will be pushed into (or return to) an end position unless the operator is applying the exact right amount of force. The three-position safety 122 switch may be arranged on the back of a handheld programming interface 120.

Figure 4:
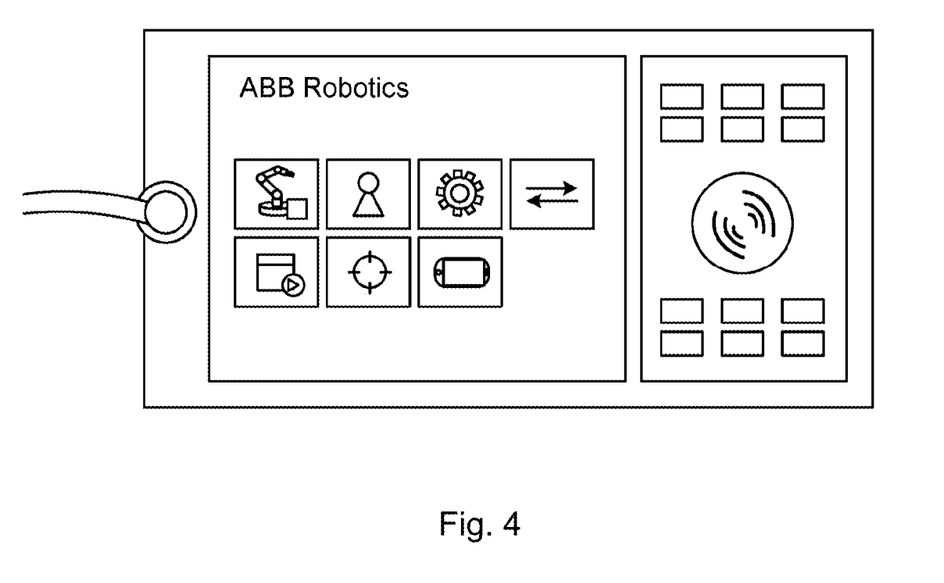
FIG. 4 is a front view of an example programming interface.

The screen 124 is suitable for displaying a graphical user interface 123. The graphical user interface 123 may accept input via the input means 121, 122 or, in embodiments where the screen 124 is touch-sensitive, directly via the screen 124. The output of the graphical user interface 123 may comprise images, text characters, symbols and other graphical elements. An example handheld programming interface 120 manufactured by the present applicant is shown in FIG. 4.

As shown in FIG. 1, the programming interface 120 is detachable from at least one component of the industrial robot 100, in the sense that the programming interface 120 is adapted for being separated manually and/or non-destructively after use from the robot controller 110 or the robot manipulator 130 or another component. During use, the programming interface 120 may for example be connected to a connection point on the robot controller 110, to establish a wired or wireless connection. This is suggested in FIG. 1, where the connection line 126 from the programming interface 120 joins a corresponding connection line from the robot controller 110 over a releasable plug and socket combination. The detachability allows one programming interface 120 to be used for training a large number of industrial robots 100. In other words, there is no one-to-one relationship between a robot manipulator 130 and a programming interface 120. In some embodiments, the robot 100 is configured such that no programming or training is possible unless a programming interface 120 is connected to the robot 100.

Generally, the programming interface 120 is configured with a view to being used as a tool in a teaching phase, during which an operator can generate executable robot instructions. The robot instructions can be generated by the programming interface 120 or the robot controller 110 on the basis of input data received in non-textual form from the operator and saved to the memory 112. The robot instructions in the memory 112 can be retrieved after termination of the training phase (e.g., during production) and executed by the robot controller 110 and robot manipulator 130. The non-textual input data may be provided using lead-through programming or manual jogging, during which the robot manipulator's 130 movements are sensed and recorded. The programming interface 120 may be configured to accept commands signifying the start and end of the training phase, commands starting and ending a recording session, commands for managing recordings (deleting, saving, cropping, editing etc.), and commands supplementing the robot manipulator's 130 movements in various ways (e.g., activating/deactivating tools, assigning speed and other attributes to movements paths). The programming interface 120 may further be configured to convey visual, acoustic or haptic information relating to programming feedback, general diagnostics, and various non-visual internal states of the robot 100.

Figure 2:
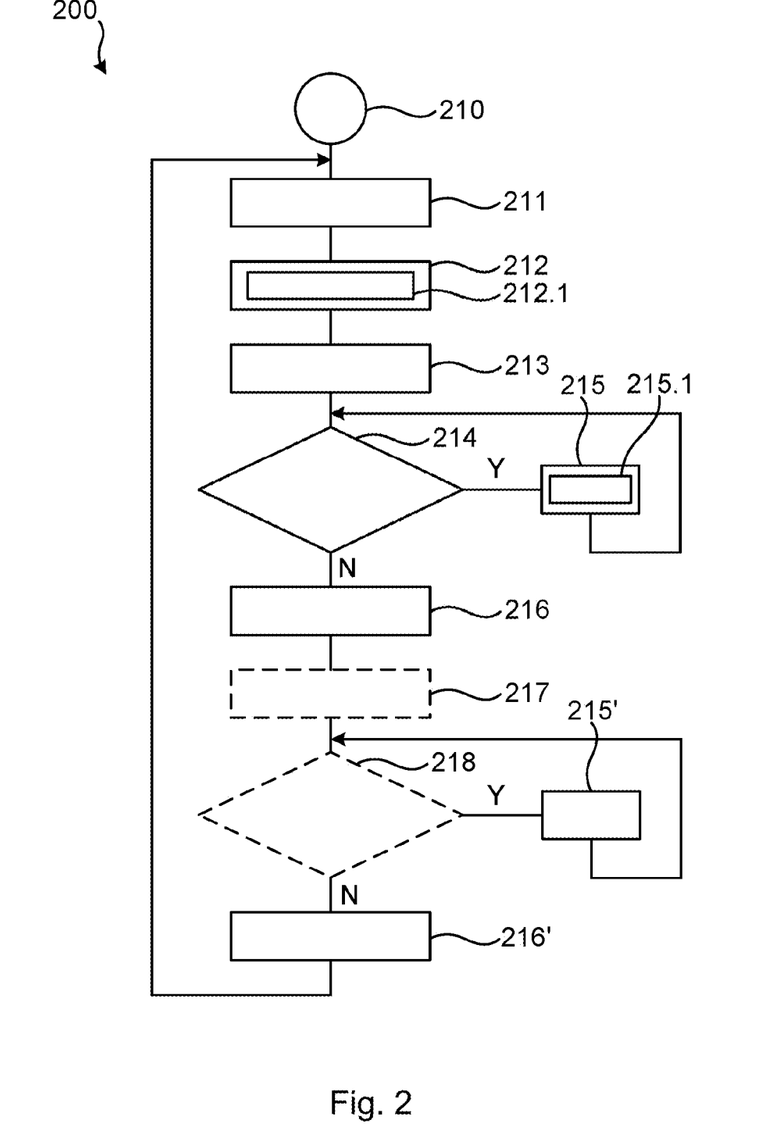
FIG. 2 is a flowchart of a method of controlling an industrial robot, according to embodiments herein.

With reference now to FIG. 2, a method 200 of controlling an industrial robot 100 of the above-described type will now be presented. The method 200 is generally speaking executed by the industrial robot 100. In particular, it can be executed by processing circuitry 111 in the robot controller 110 on its own, by processing circuitry 125 in the programming interface 120 on its own, or by a combination of these. Furthermore, the method 200 can be implemented as instructions forming a computer program that is executable by a general-purpose computer with the required signal input and signal output capabilities, or by the robot controller 110 or the programming interface 120. The inventors have conceived the method 200 as a safer way of causing the industrial robot 100 to enter the MwoDP mode than the currently available technologies permit. It is understood that no other way of entering the MwoDP mode shall be available to an operator of the industrial robot 100.

The execution of the method 200 begins at point 210 in FIG. 2. In a first step 211, a first release signal U1 is received via a first safe input means. In embodiments where the method 200 is implemented in the robot controller 110, the first release signal U1 is received 211 in the robot controller 110 even though the first safe input means may be located elsewhere, such as in the programming interface 120. The first release signal U1 may be expressed as a change in value of an analog or digital channel; alternatively, the first release signal U1 may be represented as a code transmitted over a wired or wireless carrier or medium.

It is recalled that the intended meaning of a "safe" input means—whether implemented in hardware only, software only or a combination of these—was explained in a previous section of this disclosure. In line with that definition, for example, a "safe" input means may be a safety-certified input means, i.e., one that has been certified in view of the ISO 13849-1 standard (Safety of machinery—Safety-related parts of control systems—Part 1: General principles for design), the IEC 61508 standard (Functional Safety of Electrical/Electronic/Programmable Electronic Safety-related Systems) or an application-specific standard such as ISO 26262, IEC 61511, IEC 62061, IEC 62279 etc. In particular, the "safe" input means may have been found to meet one of the Safety Integrity Levels specified in these references. A further particular example is that the "safe" input means may meet Performance Level (PL) d with Category 3 according to ISO 13849-1.

The first safe input means to be used in said first step 211 may be arranged on the programming interface 120 or separate from the programming interface 120. The first safe input means may be one of the input means on the programming interface 120 described above. In particular, the first input means may be an emergency-stop button 121 with latching, which allows the first release signal U1 to be conveniently maintained during the subsequent steps of the method 200. A similar emergency-stop button can also be provided in the vicinity of the robot manipulator 130.

In a second step 212 of the method 200, actuator-selection data V is received via an arbitrary input means at the programming interface 120. The actuator-selection data V indicates one or more of the actuators 131, namely, those that will later be caused to enter the MwoDP mode. The actuator-selection data V may be formatted as a bitstring where each position corresponds to one of the selectable actuators 131.

It is recalled that the arbitrary input means may be implemented as a "safe" input means or as a non-safe input means. Choosing a non-safe input means as the arbitrary input means can be the economically more appealing option. However, the use of a "safe" input means will not deprive the method 200 of any of its effects or benefits—rather the degree of safety is marginally strengthened—but may be an unnecessarily costly option. The arbitrary input means may comprise a graphical user interface displayed on the screen 124 of the programming interface 120. For example, the operator may be shown a visual representation of the actuators 131 at their approximate positions relative to the robot manipulator 130, and is enabled to select and unselect them by touch commands or other forms of input.

The screen 124 may optionally be used to display a (graphical) user interface related to functionalities other than the MwoDP mode. Such functionalities may for example include those reviewed above, which are related to the teaching phase, including commands signifying the start and end of the training phase, commands starting and ending a recording session, commands for managing recordings, and commands supplementing the robot manipulator's 130 movements in various ways. The functionalities related to the teaching phase and the functionalities related to the MwoDP mode can be provided as two menus or submenus of a common graphical user interface. Under this option, because the screen 124 is used for purposes in addition to the MwoDP functionalities, any errors affecting the screen 124 are likely to be discovered early, whereby the risk of receiving incorrect actuator-selection data via the screen 124 may become more acceptable.

In a third step 213 of the method 200, a second release signal U2 is received via a second safe input means. Again, the second safe input means may be provided at a different unit (e.g., the programming interface 120) than the one receiving the second release signal U2 (e.g., the robot controller 110). Just like the first release signal U1, the second release signal U2 may be expressed as a change in value or by the transmitting of a pre-agreed code or symbol. The second safe input means is "safe" in the sense discussed above. The second safe input means is preferably non-latching, i.e., it returns to an inactive position as soon as the operator lets go of it. In particular, the three-position safety switch 122 on the programming interface 120 may act as second safe input means. If the second safe input means is a graphical element displayed on a safe touch screen used for another purpose previously (e.g., entering the actuator-selection data V), then it is preferable to display this element in a different location than such other graphical elements that were previously used for said other purpose. This will require operators to move their finger in order to activate the second safe input means, which reduces the risk of unintentional activation.

In a fourth step 214 of the method 200, a criterion is evaluated whether the first and second release signals U1, U2 are being received. If this is found to be true (Y branch of box 214 in FIG. 2), in a fifth step 215 of the method 200, the actuators 131 indicated by the actuator-selection data V are caused to enter the MwoDP mode. On the level of one actuator 131 that comprises drive means 131.1 and braking means 131.2, wherein the braking means 131.2 are engaged by default in some conditions, the entry into MwoDP mode may include releasing the braking means 131.2.

If the criterion evaluates false (N branch of box 214), it is ensured, in a sixth step 216, that the actuators 131 are not in MwoDP mode. To achieve this, more precisely, the status of the actuators 131 may be retrieved, and if they are in MwoDP mode, they are caused to leave the MwoDP mode; if they are not in MwoDP, no action is taken.

In some embodiments, the fourth step 214 includes an additional timeout condition, to the effect that the second release signal must be received within a predefined timeout period $T_0$. If the timeout period $T_0$ is exceeded, the outcome of step 214 will be negative even if both the first and second release signals U1, U2 are simultaneously received at a later point in time. The predefined timeout period $T_0$ may for example be of the order of tens of seconds, such as 30 s. If the second release signal U2 arrives later than this, it is likely due to inadvertent activation, e.g., while the programming interface 120 is carried in an operator's pocket.

In some embodiments, the execution flow of the method 200 loops back from the fifth step 215 to the fourth step 214, as illustrated in FIG. 2. The loop-back to the fourth step 214 may optionally be configured to occur after a predetermined delay $T>0$. This achieves a behavior by which the indicated actuators 131 stay in MwoDP mode for exactly as long the operator generates the second release signal U2, with a granularity of T.

In some embodiments of the method 200, bystanders and operators are made aware of the fact that an entry into MwoDP mode is imminent. More precisely, a visual indicator associated with the robot manipulator 130 is exhibited while the graphical user interface is being displayed on the screen 124 and/or while the graphical user interface is being accessed by a user. Exhibiting the visual indicator may include illuminating the lamp 132 shown in FIG. 1.

As explained above, the programming interface 120 may be detachable from the components of the industrial robot 100, to allow it to be moved and used for training further robots 100 in the same or a different worksite. Effectively, and especially in large deployments, the programming interface 120 may be present at a given robot 100 for a relatively minor fraction of total time. If the ability to use the MwoDP mode more frequently is considered important, the method 200 can be extended by some additional steps to allow the MwoDP mode to be entered even when the programming interface 120 is not available, in accordance with the embodiment to be described next.

To achieve an alternative way of entering the MwoDP mode according to this embodiment, the industrial robot 100 is pre-programmed with static-actuator selection data V' (step 217), and it is further configured to evaluate a condition (step 218) for triggering the MwoDP mode. The static actuator-selection data V' indicates, similar to the actuator-selection data V, one or more of the actuators 131 to be caused to enter the MwoDP mode when the condition is found to be true. The pre-programming step 217, in which the static actuator-selection data V' is received, normally takes place before the first release signal U1 is received. The condition is whether the first release signal U1 is still received and the second release signal U2 is received via an alternative input port separate from the programming interface 120. The alternative input port may be the above-described alternative input port 140 on the robot controller 110, to which an input means 141 can be connected. The alternative input port 140 may be a generic input port which can be designated in a system configuration of the robot controller 110 for override purposes, i.e., for the input port 140 to receive the second release signal U2. The input means 141 to be connected thereto is preferably a "safe" input means in the sense discussed above, such as a safety-certified three-position safety switch, a safety-certified non-latching ESTOP button or the like. The input means 141 may be shared with another industrial robot (e.g., it may be included in a detachable unit dedicated for MwoDP operation), or the input means 141 may be proper to a single industrial robot 100. The alternative input port 140 can optionally be implemented as a safe input port. The first release signal U1 is preferably received via a first safe input means (e.g., ESTOP button) that is separate from the programming interface 120.

If the condition evaluates true (Y branch of box 218), the actuators 131 indicated by the static actuator-selection data V' are caused to enter the MwoDP mode (step 215'). From a functional point of view, the static actuator-selection data V' replaces the actuator-selection data V in the present embodiment. Otherwise, if the condition evaluates false (N branch of box 218), it is verified that the actuators 131 are not in MwoDP mode (step 216'). The steps 215' and 216' can be implemented in the various ways described for steps 215 and 216 above, including the loop-back behavior.

Optionally, to prevent an unintentional entry into the MwoDP mode in the alternative way, the actuators' 131 entry into the MwoDP mode is delayed for a predefined delay period; if both release signals U1, U2 are no longer being received at the end of the delay period, the MwoDP mode will not be entered. The present embodiment may include alerting the operator and any bystanders using a visual indicator, analogous to what was described above. Since however the actuator-selection data is static, the operator will not resort to any graphic user interface, the usage of which can be used to trigger the visual indicator. Instead, the visual indicator 132 associated with the robot manipulator 130 is exhibited for the duration of the delay period during which the actuators' 131 entry into the MwoDP mode is delayed.

In a further variation of the present embodiment with static actuator-selection data V', the condition evaluated in step 218 constitutes the only way of entering the MwoDP mode. This is to say, the method 200 comprises step 211 (wherein the first safe input means is not provided in a programming interface 120), step 217, step 218 and the conditional steps 215' and 216'. According to the present embodiment, the method 200 can be executed by an industrial robot 100 to which no programming interface 120 is currently connected. In particular, the method 200 may be implemented in the robot controller 110 of the industrial robot 100.

The method 200, according to any of the above-described embodiments, can be improved with respect to the reliability of the communication link between the programming interface 120 and the robot controller 110. Attention is directed to the way in which the actuator-selection data V (or static actuator-selection data V') is transmitted to the robot controller 110. More precisely, the actuator-selection data V is transmitted from the programming interface 120 to the robot controller 110 using a safe communication protocol. A safe communication protocol can be understood as one that adequately protects the integrity of data traveling on the communication path between the programming interface 120 and the robot controller 110.

Figure 3:
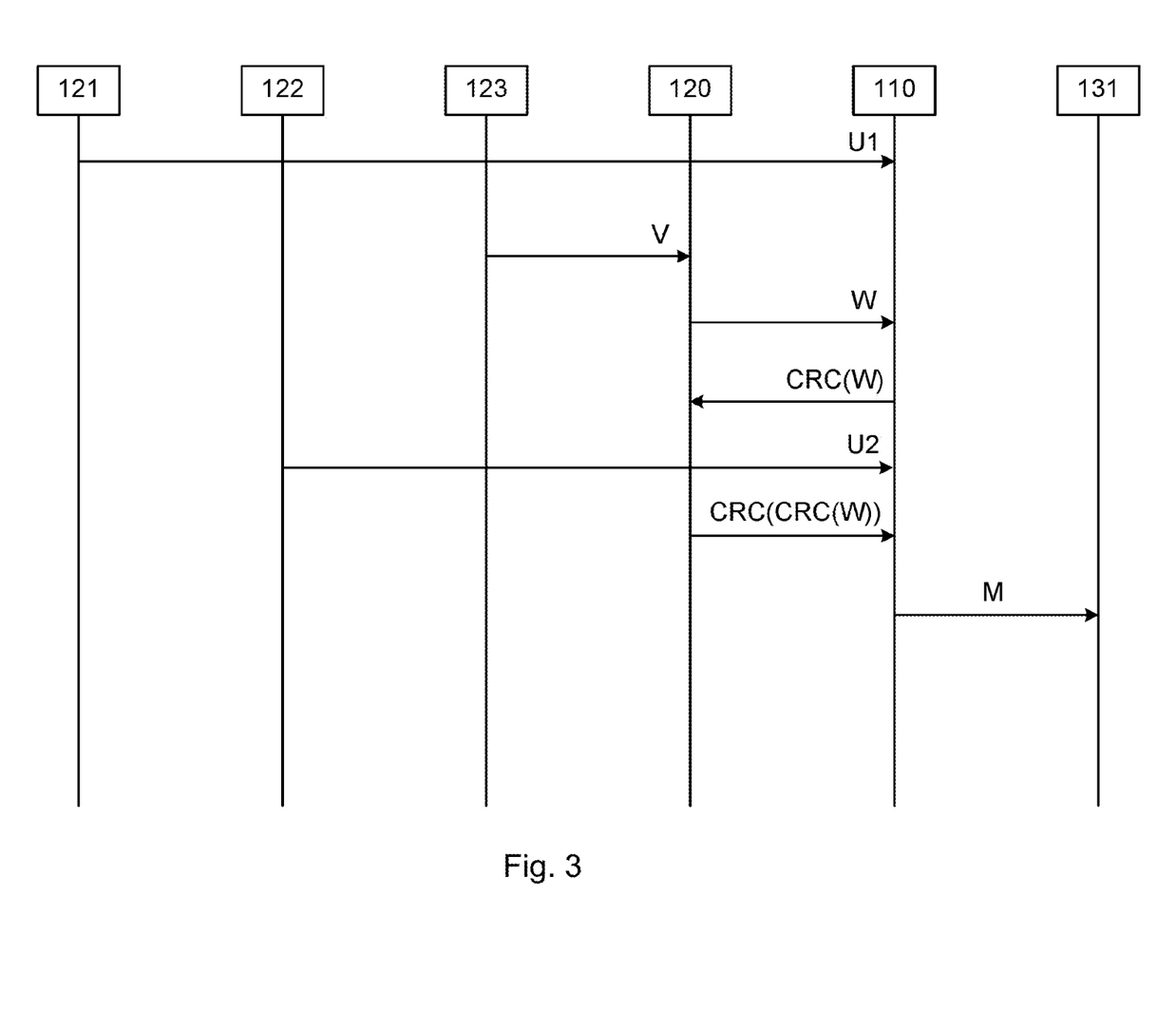
FIG. 3 is a sequence diagram of a safe communication protocol.

An example safe communication protocol is illustrated by the sequence diagram in FIG. 3, which refers to an embodiment where the method 200 is implemented in the robot controller 110. The sequence diagram illustrates signals and data exchanged among the first safe input means 121, the second safe input means 122, the graphical user interface 123 on the screen 124 of the programming interface 120 (as one example of a non-safe input means), the programming interface 120 (e.g., processing circuitry 125 therein), the robot controller 110, and the actuators 131 indicated by the actuator-selection data V. The signals and data are represented as arrows, and the downward direction in FIG. 3 represents ascending time.

As shown in FIG. 3, after the robot controller 110 has received the first release signal U1, the operator goes on to enter the actuator-selection data V using the programming interface 120. After the programming interface 120 has captured the actuator-selection data V, it transmits to the robot controller 110 a code (e.g., a binary number) W, from which the actuator-selection data V can be decoded. Preferably, the code W is long enough that a mix-up with interference and other artefact waveforms affecting the communication path from the programming interface 120 to the robot controller 110 has a controlled and very low probability. In response, the robot controller 110 transmits a checksum or check value CRC(W) of the code W. The robot controller 110 may be configured to compute the checksum using a one-way function suitable for cyclic redundancy check (CRC). Many one-way functions for this purpose have been described in the literature, one example being CRC32, for which a software implementation can be retrieved from the website sourceforge.net/projects/crccalculator/files/CRC/. Returning to FIG. 3, if the programming interface 120 is able to reproduce—and thereby verify—the checksum CRC(W) calculated by the robot controller 110, it computes a checksum of the checksum CRC (CRC(W)) and transmits this to the robot controller 110. Optionally, as suggested in FIG. 3, the transmission of the checksum of the checksum CRC (CRC(W)) may be conditional upon the second release signal U2, which can be eavesdropped by the programming interface 120, although said second release signal U2 is in fact destined for the robot controller 110 executing the method 200. In turn, the robot controller 110 tries to verify the received checksum of the checksum CRC (CRC(W)) by recomputing it on the basis of the previously calculated checksum CRC(W). If the robot controller 110 has received the second release signal U2 and the verification succeeds (substep 215.1 in FIG. 2), the robot controller 110 transmits a control signal M to actuators 131 in the robot manipulator 130 ordering them to enter the MwoDP mode. Conversely, if the programming interface 120 is unable to reproduce the checksum CRC(W), the protocol terminates, and the MwoDP mode will not be triggered for lack of the actuator-selection data V.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of controlling an industrial robot,
wherein the industrial robot includes a robot controller, a programming interface, which is separate from the robot controller, and a robot manipulator with a plurality of actuators,
the method comprising:
receiving a first release signal via a first safe input means;
receiving actuator-selection data, which indicates one or more of the actuators, via an arbitrary input means at the programming interface;
receiving a second release signal via a second safe input means at the programming interface after having received the actuator-selection data; and,
in response to determining that the first and second release signals are still received, causing the one or more of the actuators indicated by the actuator-selection data to enter a movement-without-drive-power mode.

2. The method of claim 1, further comprising:
in response to determining that the first and/or second release signal is no longer received, causing the indicated actuators to leave the movement-without-drive-power mode.

3. The method of claim 1, wherein said determining that the first and second release signals includes verifying a timeout condition by which the second release signal is required to be received within a predefined timeout period.

4. The method of claim 1, wherein the first safe input means is arranged at the programming interface.

5. The method of claim 1, wherein the first safe input means is an emergency-stop button with latching.

6. The method of claim 1, wherein the second safe input means is a three-position safety switch.

7. The method of claim 1, wherein the programming interface is a teach pendant.

8. The method of claim 1, wherein the programming interface is detachable from at least one component of the industrial robot.

9. The method of claim 1, wherein the arbitrary input means is a graphical user interface displayed on a screen of the programming interface.

10. The method of claim 9, further comprising:
exhibiting a visual indicator associated with the robot manipulator while the graphical user interface is being displayed on the screen and/or while the graphical user interface is being accessed by a user.

11. The method of claim 9, wherein the screen is further configured to display a user interface related to functionalities other than the movement-without-drive-power mode.

12. The method of claim 1, wherein:
each of the actuators includes drive means and braking means; and
the braking means are configured to engage while the drive means are inactive, except in the movement-without-drive-power mode.

13. The method of claim 1, further comprising:
receiving static actuator-selection data by pre-programming; and
in response to determining that the first release signal is still received and that the second release signal is received via an alternative input port separate from the programming interface, causing the actuators indicated by the static actuator-selection data to enter the movement-without-drive-power mode.

14. The method of claim 13, wherein the alternative input port is connected to an input means that is not shared with any other industrial robot.

15. The method of claim 13, further comprising:
delaying the actuators' entry into the movement-without-drive-power mode for a predefined delay period.

16. The method of claim 15, further comprising:
exhibiting a visual indicator associated with the robot manipulator during the delay period.

17. The method of claim 1, further includes receiving the actuator-selection data from the programming interface at the robot controller using a safe communication protocol.

18. A robot controller for use in an industrial robot, which includes a programming interface, which is separate from said robot controller, and a robot manipulator with a plurality of actuators, wherein:
the robot controller is communicatively coupled to a first safe input means, a second safe input means, and an arbitrary input means; and
the robot controller comprises processing circuitry configured to perform a method of controlling the industrial robot,
the method including:
receiving a first release signal via the first safe input means;
receiving actuator-selection data, which indicates one or more of the actuators, via the arbitrary input means at the programming interface;
receiving a second release signal via the second safe input means at the programming interface after having received the actuator-selection data; and,
in response to determining that the first and second release signals are still received, causing the one or more of the actuators indicated by the actuator-selection data to enter a movement-without-drive-power mode.

19. A non-transitory computer program comprising instructions to cause the robot controller for use in an industrial robot, which includes a programming interface, which is separate from said robot controller, and a robot manipulator with a plurality of actuators, wherein:

the robot controller is communicatively coupled to a first safe input means, a second safe input means, and an arbitrary input means; and the robot controller includes processing circuitry configured to execute a method of controlling the industrial robot, the method comprising:

receiving a first release signal via the first safe input means;

receiving actuator-selection data, which indicates one or more of the actuators, via the arbitrary input means at the programming interface;

receiving a second release signal via the second safe input means at the programming interface after having received the actuator-selection data; and, in response to determining that the first and second release signals are still received, causing the one or more of the actuators indicated by the actuator-selection data to enter a movement-without-drive-power mode.

* * * * *